US012638416B2

(12) United States Patent
Fraboni et al.

(10) Patent No.: US 12,638,416 B2
(45) Date of Patent: May 26, 2026

(54) METHOD FOR EVALUATING THE CAPACITY OF A SERUM TO NEUTRALISE A VIRUS

(71) Applicant: ALMA MATER STUDIORUM—UNIVERSITA' DI BOLOGNA, Bologna (IT)

(72) Inventors: Beatrice Fraboni, Bologna (IT); Francesco Decataldo, Bologna (IT); Marta Tessarolo, Bologna (IT); Alessandra Scagliarini, Bologna (IT); Vittorio Sambri, Bologna (IT); Catia Giovannini, Bologna (IT)

(73) Assignee: ALMA MATER STUDIORUM—UNIVERSITA' DI BOLOGNA, Bologna (IT)

( * ) Notice: Subject to any disclaimer, the term of this patent is extended or adjusted under 35 U.S.C. 154(b) by 199 days.

(21) Appl. No.: 18/690,323

(22) PCT Filed: Sep. 8, 2022

(86) PCT No.: PCT/IB2022/058448
§ 371 (c)(1),
(2) Date: Mar. 8, 2024

(87) PCT Pub. No.: WO2023/037275
PCT Pub. Date: Mar. 16, 2023

(65) Prior Publication Data
US 2024/0377351 A1     Nov. 14, 2024

(30) Foreign Application Priority Data
Sep. 9, 2021   (IT) ........................ 102021000023354

(51) Int. Cl.
*G01N 27/414*        (2006.01)

(52) U.S. Cl.
CPC ................................ *G01N 27/4145* (2013.01)

(58) Field of Classification Search
CPC ....... G01N 21/45; G01N 27/414–4168; G01N 33/5438; G01N 33/56983;
(Continued)

(56) References Cited

U.S. PATENT DOCUMENTS 4,238,757 A * 12/1980 Schenck .............. H10D 64/685
257/253
2022/0034885 A1* 2/2022 Mond .............. G01N 33/56983

OTHER PUBLICATIONS

International Search Report and Written Opinion, mailed Dec. 6, 2022, from PCT/IB2022/058448, 13 pages.
(Continued)

*Primary Examiner* — Gurpreet Kaur
(74) *Attorney, Agent, or Firm* — Workman Nydegger

(57) ABSTRACT

A method for evaluating a capacity of a serum to neutralize a virus is disclosed. The method includes preparing a solution comprising at least one cell, a serum and a virus, placing the solution in contact with an organic electrochemical transistor comprising a source, a drain and a gate electrode, wherein the source and drain electrodes are electrically connected by means of a conductive channel, applying a potential difference between the drain and source electrode, applying a plurality of pulses of a potential difference between the gate and source electrode and measuring a respective plurality of values of pulses of current flowing through the channel; calculating a value of an estimation of a response time of the transistor, and comparing the value of the estimated response time with respect to a threshold value and detecting whether the serum has a neutralising capacity against the at least one virus.

19 Claims, 5 Drawing Sheets

4

4-7 (cell layer)
4-5 (Pedot:Pss)
4-3 (gold)
4-1 (glass)

channel gate

V_g solution with cella, a serum and a virus
4-6 (cell layer)
4-4 (Pedot:Pss)
4-2 (gold)
4-1 (glass substrate)

cell
anion
cation

Pedot:Pss
gold
glass

(58) Field of Classification Search
CPC .......... G01N 2333/165; G01N 2469/20; H01L
21/68; H01L 2924/13073
See application file for complete search history.

(56) References Cited

OTHER PUBLICATIONS

Tian et al., "Novel, Real-Time Cell Analysis for Measuring Viral
Cytopathogenesis and the Efficacy of Neutralizing Antibodies to the
2009 Influenza A (H1N1) Virus", PLOS One, vol. 7, No. 2, Feb. 20,
2012, p. e31965.
Decataldo et al., "Organic Electrochemical Transistors: Smart Devices
for Real-Time Monitoring of Cellular Vitality", Advanced Materials
Technologies, DE vol. 4, No. 9, Jun. 4, 2019, p. 1900207.
Jimison et al., "Measurement of Barrier Tissue Integrity with an
Organic Electrochemical Transistor", Advanced Materials, vol. 24,
No. 44, Sep. 5, 2012 (Sep. 5, 2012), p. 5919-5923.
Muruato et al., "A high-throughput neutralizing antibody assay for
COVID-19 diagnosis and vaccine evaluation", Nature Communi-
cations, vol. 11, No. 1, Aug. 13, 2020.
Balcioglu et al., "SARS-CoV-2 neutralizing antibody development
strategies", Turkish Journal of Biology, vol. 44, No. 3, Jun. 21,
2020, p. 203-214.
Decataldo et al., "Fast and real-time electrical transistor assay for
quantifying SARS-CoV-2 neutralizing antibodies", Communica-
tions Materials, vol. 3, No. 1, Jan. 27, 2022.

* cited by examiner

METHOD FOR EVALUATING THE CAPACITY OF A SERUM TO NEUTRALISE A VIRUS

BACKGROUND

Technical Field

The present disclosure generally relates to the field of in vitro analysis of cell cultures. More in particular, the present disclosure concerns a method for evaluating the capacity of a serum to neutralize a virus.

Description of the Related Art

The growing spread of infectious diseases, in particular, of infectious diseases of the respiratory tract, is driving scientific research towards a search for new diagnostic and therapeutic strategies. The COVID-19 pandemic caused by the coronavirus (CoV) SARS-CoV-2 has led to an unprecedented demand for diagnostic tests and therapies against the virus, aggravating an epidemiological situation already abounding in new potential pathogenic microorganisms.

Various studies conducted on severe acute respiratory syndrome (SARS) and Middle East respiratory syndrome (MERS) have demonstrated the presence of specific neutralising antibodies against these viruses in 80-100% of patients two weeks after the appearance of symptoms. The antibodies can suppress the replication of SARS-CoV-2 through viral neutralisation, but they can also participate in the pathogenesis and progression of COVID-19 through a process defined as antibody-dependent enhancement.

For this reason, it is very important to evaluate the presence of neutralising antibodies, produced during SARS-CoV-2 infection, for prognostic purposes in clinical practice. Furthermore, the immunological tests available for quantifying the neutralising antibodies in patients are fundamental also in order to provide information and data on the effectiveness of a vaccine, with the aim of giving priority to different vaccine candidates and supporting the requests for authorisation of the vaccine. Harmonisation of the results of tests on neutralising antibodies (both against SARS-CoV-2 and against pseudoviruses) is particularly important also in preclinical studies on vaccines, which involve non-human primates, to enable accurate comparisons with those obtained in clinical studies.

There exist various methods for determining the antibody concentration, but the PRNT (plaque reduction neutralisation test) is considered the gold standard for measuring the levels of neutralising antibodies. The PRNT was developed by Dulbecco for animal virus inactivation (or neutralisation) studies and modified to measure the antibody neutralisation titre in serum. The PRNT has already been used to test the level of protection of the population in countries affected by other zoonotic coronaviruses, such as MERS-CoV. The PRNT requires the formation of a virus-antibody complex in vitro, with an incubation of 30 minutes at 37° C. and subsequent seeding on cells susceptible to viral infection. After the incubation (typically 72 hours), the cytopathic effect (CPE) is evaluated by fixing and staining the cells with formaldehyde and crystal violet and, subsequently, reading the absorbance with spectrophotometer at 560 nm. The highest serum dilution that neutralizes 90% of viral replication and, therefore, its cytopathic effect, is reported as the neutralising titre. This technique entails many economic costs, from the materials used to the highly specialised personnel necessary to the disposal of toxic waste. Furthermore, it requires a long time to obtain the results (72 hours after infection), thus precluding rapid reporting times. Furthermore, formaldehyde and crystal violet are known to have carcinogenic effects and must be disposed of according to very strict regulations. Because of the high infectivity and pathogenicity of SARS-CoV-2, the virus must be handled in specific biosafety level 3 (BSL-3) facilities. The PRNT is thus technically challenging and difficult to automate, making it unsuitable for large-scale studies on serum samples, such as phase III clinical studies on a human vaccine.

In order to avoid having to do with infectious CoV-2, various safe systems have been developed, which are based on pseudoviruses at a biosafety level of 2 (BSL2). Even though they have demonstrated to be sensitive and reliable, said tests are often cumbersome, long and costly in procedural terms.

Thus, there is a strongly felt need to have a test capable of evaluating the presence of antibodies in a serum, i.e. the neutralising capacity of a serum. In particular, there is a great demand for a test or a method that enables the presence of antibodies in a serum and the capacity of the latter to neutralize the virus to be evaluated rapidly and with limited costs.

BRIEF SUMMARY

One embodiment of the present disclosure relates to an in vitro method for evaluating the capacity of a serum to neutralize a virus as defined in the appended independent claim and by the embodiments thereof described in the dependent claims.

The basic idea is to use an organic electrochemical transistor to measure the state of growth of cells cultured directly on the organic electrochemical transistor in order to evaluate the effectiveness of a serum in neutralising a virus, by estimating the value of a response time of the organic electrochemical transistor and comparing the variable pattern over time of the value of the response time with respect to a threshold value expected for healthy cells, wherein the threshold value is determined for each cell to be analysed/virus pair. The capacity of a serum to neutralize a virus is indicative of the presence of antibodies capable of neutralising the tested virus.

The Applicant has perceived that the evaluation method in accordance with the present disclosure makes it possible to eliminate the use of formaldehyde, makes it possible to have an objective result in real time, enables a reading also by personnel who are not highly specialised, in much shorter times compared to the known technologies, and is suitable for laboratories with a low technological level.

Another advantage regards the possibility of obtaining an objective and automated measurement in large part performed remotely with a considerable reduction in the risks of prolonged exposure of health care workers to a highly contagious virus. The tests are performed in real time inside an incubator in biosafety level (BSL) 2/3/4 laboratories without the use of toxic reagents.

From an economic viewpoint, the objective measurement is obtained without the use of a very costly, complex and cumbersome instrument (like a spectrophotometer).

The manufacture of this device can take place with low-cost processes and on a large scale, thus ensuring the use thereof in countries with a low degree of technological development.

The disclosure is applicable to serum neutralisation tests for the identification of antibodies produced against any viral species responsible for pathologies in animals and humans, therefore also viruses other than SARS-CoV-2.

DESCRIPTION OF THE SEVERAL VIEWS OF THE DRAWINGS

Additional features and advantages of the disclosure will become apparent from the description that follows of an embodiment and of the variants thereof, provided by way of example with reference to the appended drawings, in which.

DEFINITIONS

Figure 1:
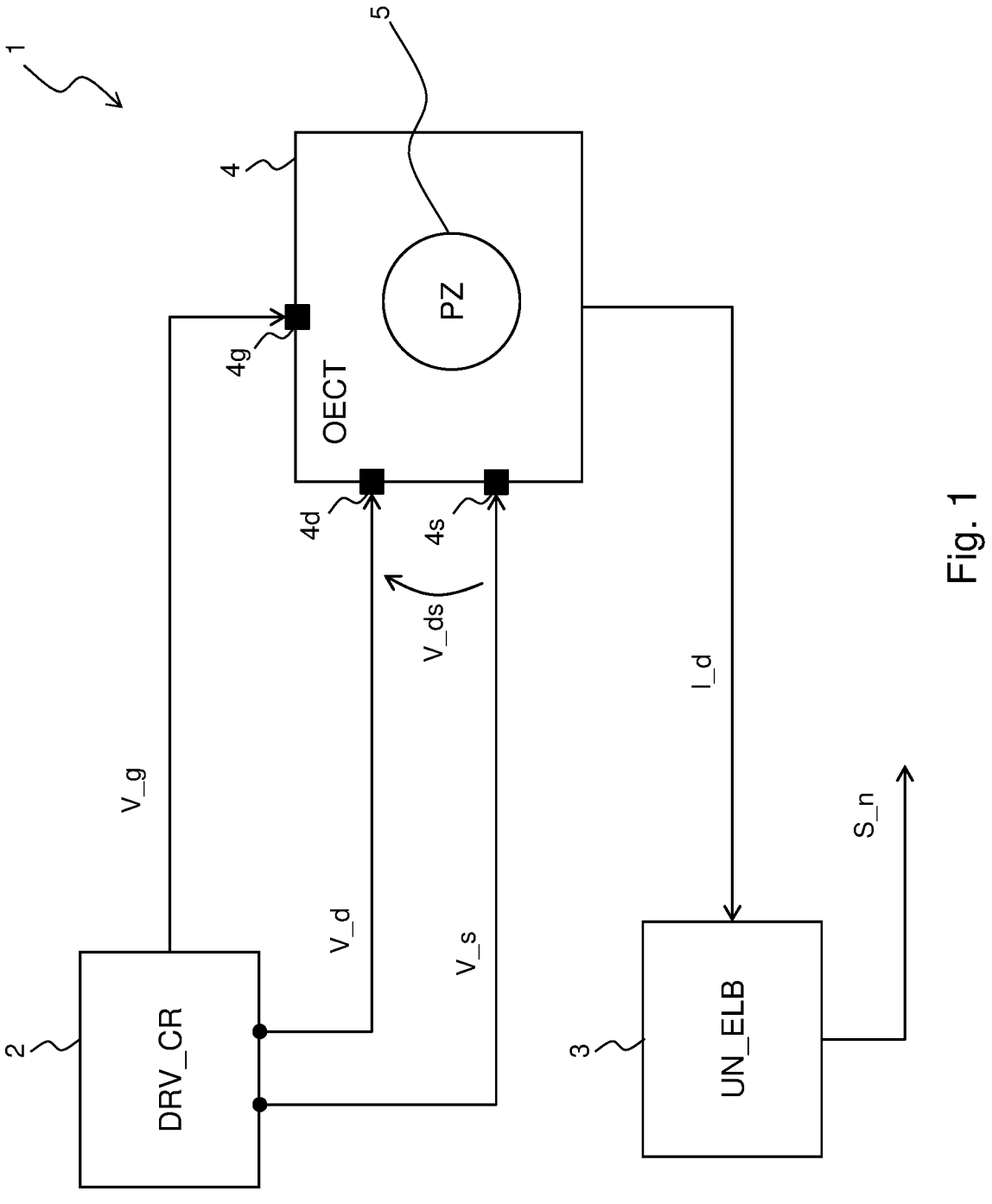
FIG. 1 shows a block diagram of an electronic device for evaluating the capacity of a serum to neutralize a virus according to the disclosure.

In the context of the present disclosure, the term "serum neutralisation test" means a test capable of evaluating the capacity of a serum to neutralize a virus, i.e. to prevent the infection of a cell by a pathogenic agent, preferably a virus.

In the context of the present disclosure, the term "neutralising serum" means a serum obtained from a human individual or animal capable of preventing or reducing an infection by a pathogenic agent.

In the context of the present disclosure, the term "non-neutralising serum" means a serum obtained from a human individual or animal or an artificial serum that is not capable of preventing an infection by a pathogenic agent.

In the context of the present disclosure, the term "coronavirus" (abbreviated as "CoV") means a broad family of respiratory viruses that can cause diseases from mild to moderate, which range from the common cold to respiratory syndromes such as MERS (Middle East respiratory syndrome) and SARS (severe acute respiratory syndrome).

In the context of the present disclosure, the term "infection" means a process characterised by the penetration into and multiplication in a cell of single-cell pathogenic microorganisms (infectious agents: bacteria, fungi, protozoa) or of viruses. The concept of infection is not identifiable with that of infectious disease or pathology, as there exist cases of infection without any morbid phenomena, i.e. asymptomatic individuals who are carriers of the pathogen.

DETAILED DESCRIPTION

It should be observed that in the following description, identical or analogous blocks, components or modules are indicated in the figures with the same numerical references, even if they are shown in different embodiments.

The disclosure is implemented using a container comprising a plurality of wells (for example six), each provided with at least one biocompatible organic electrochemical transistor (OECT), preferably transparent or semi-transparent with respect to the cell layer.

The cells are seeded in the wells, creating a cell layer, and the organic electrochemical transistor measures the resistance of the cell layer, which depends on the integrity thereof and the health of the cells themselves.

The serum neutralisation test is based on the fact that the cell cultures or cell lines used in the neutralisation assays form a confluent monolayer which represents a physical barrier for the transport of ions: this barrier property can be quantified electrically as transepithelial electrical resistance (TEER) in an impedance spectroscopy experiment.

During viral infection, the barrier properties are modified due to the alterations induced during viral replication which lead to a modification of the TEER.

The neutralisation test is highly sensitive and specific and can be applied to all cytopathogenic viruses to measure the neutralising antibody titre after natural exposure, after vaccination or after the passive transfer of maternal antibodies.

The conventional serum neutralisation test methods performed in vitro are based on the inhibition of virus infectivity in a cell culture in the presence of neutralising antibodies in the serum.

The determination of the titre can be based on the presence or absence of a cytopathic effect.

The serum neutralisation test is relatively inexpensive when standard laboratory equipment is used, but requires technical abilities to carry out the test compared to other serological methods, as the analysis is performed by optical microscopy and the evaluation of images by means of automated mass screening is difficult to apply; on the other hand, the serum neutralisation test is a serological method capable of identifying neutralising antibodies potentially in all animal species including humans.

Furthermore, in the case of high-risk viral pathogens, a visual evaluation can be associated with a risk of infection for the operator.

The disclosure envisages exploiting organic electrochemical transistors for evaluating, in real time, the evolution of the cytopathic effect caused by different viral species cultured in cell cultures or lines in serum neutralisation tests or to study the dynamics of viral replication in vitro.

The serum neutralisation test comprises assaying serial dilutions of human or animal serum to evaluate the minimum concentration of circulating antibodies capable of neutralising a virus with a known titre through an analysis of the state of health of the cell layer by means of the electronic device according to the disclosure.

Advantageously, the transparency or semi-transparency of the organic electrochemical transistor allows optical analyses to be performed simultaneously; furthermore, at the end of monitoring, the cells can be recovered for possible molecular analyses. This effect opens the way for the performance of a real-time electrical neutralisation test based on monitoring of the TEER.

The electronic device according to the disclosure comprises a plurality of dedicated sterilizable wells, into which the organic electrochemical transistor is inserted.

The multiple wells are connected to a processing unit running a suitable software program for analysing the collected data (for example on a personal computer).

Preferably, it is possible to determine beforehand (i.e. before the test on the sample to be analysed) a threshold value for distinguishing healthy cells from infected cells, wherein the threshold value is determined for each type of cells and viruses to be tested.

One embodiment relates to an in vitro method for evaluating the capacity of a serum to neutralize a virus.

The method comprises the following steps:

a) preparing a solution comprising at least one cell, at least one serum and at least one virus;

b) placing the solution in contact with an organic electrochemical transistor comprising a source electrode, a drain electrode and a gate electrode, wherein the source and drain electrodes are electrically connected by means of a conductive channel comprising a conducting or semiconducting polymer, wherein the at least one cell is adhered to said channel and/or to the gate electrode or the at least one cell is adhered to a permeable porous support interposed between the conductive channel and the gate electrode;

c) applying a potential difference between the drain electrode and the source electrode, applying a plurality of pulses of a potential difference between the gate electrode and the source electrode and measuring a respective plurality of values of pulses of current flowing through the channel;

d) calculating a value of an estimation of a response time of the organic electrochemical transistor, as a function of the plurality of values of the measured current;

e) comparing the value of the estimated response time with respect to a threshold value and detecting, as a function of said comparison, whether the serum has a neutralising capacity against the at least one virus.

According to one embodiment, the value of the estimation of the response time is calculated by interpolating the plurality of values of the measured current with a bi-exponential decay curve and measuring therefrom the value of a time response parameter T1 of the bi-exponential curve.

In particular, the current I_d through the channel is calculated with the following formula:

$$I\_d = a * \exp(t/T1) + b * \exp(t/T2) + e$$

wherein:

t is the time;

exp is the exponential function;

a, b, e are configuration parameters;

T1 is a time parameter that represents the polymer charging time influenced by the ion blocking properties of the cell layer;

T2 is a time parameter that depends on the cell layer charging time;

and wherein the current pulses are normalised between a value 1 which corresponds to the maximum channel current value under conditions of direct polarisation of the organic electrochemical transistor and a value 0 which corresponds to an average value of a defined number of points of the channel current when the latter has reached the stationary regime.

Even more in particular, the response time of the organic electrochemical transistor is equal to the value of the time parameter T1, which in turn is normalised with respect to the value of T1 that it has prior to the cell culture (indicated as T_nc), i.e. according to the following formula:

$$\text{response time } [a.u.] = T1/T\_nc.$$

For further details related to the calculation of the response time, reference may be made to the document by Francesco Decataldo et al., "Organic Electrochemical Transistors: Smart Devices for Real-Time Monitoring of Cellular Vitality", *Advanced Materials Technologies*, 4, 1900207 (2019), including the appended "Supporting information".

In particular, said plurality of pulses of the potential difference (i.e. voltage difference) between the gate electrode and the source electrode is a square wave having a difference between the high value and the low value for example equal to 0.3 Volts; more in general, the high value of the pulses of the square wave is comprised between 0.1 Volts and 0.8 Volts and the low value is comprised between −0.3 Volts and 0.5 Volts.

The duration of the high value is comprised between 0.005 seconds and 10 seconds, preferably equal to 0.5 seconds; the duration of the low value is comprised between 0.1 seconds and 30 seconds, preferably equal to 1.5 seconds.

Furthermore, the value of the potential difference (i.e. voltage difference) between the drain electrode and the source electrode is comprised between −0.4 Volts and 0.2 Volts, preferably equal to −0.1 Volts.

The conducting polymer is selected for example from the following list: PEDOT:PSS, PEDOT-S, PEDOT:TOS, PEDOTOH:ClO4, PEDOT-co-PEDOTOH:ClO4, P3HT, PTHS, BBL, p(g2T-TT), PTHS-TMA<+>-co-P3HT, p(gNDI-g2T), p(g0T2-g6T2), Polyaniline, Polypyrrole, P-90.

In one embodiment, the at least one virus belongs to the Coronaviridae family; it is preferably selected from SARS-CoV, MERS-CoV and SARS-CoV-2. Preferably, the at least one virus is SARS-Cov-2. In other words, the method makes it possible to evaluate the serum neutralisation of at least one virus belonging to the Coronaviridae family, preferably SARS-CoV-2.

The serum is preferably obtained from an individual with techniques known to the person skilled in the art. The serum is preferably obtained from an individual who has received a treatment against the at least one virus.

In one embodiment, the serum is obtained from an individual who has received a vaccine against the at least one virus, preferably a vaccine against a Coronavirus, more preferably a vaccine against SARS-CoV-2.

In a further embodiment, the serum is obtained from an individual who has developed an infection caused by the at least one virus, preferably caused by a coronavirus, more preferably caused by SARS-CoV-2.

With reference to FIG. 1, it shows a block diagram of an electronic device 1 for evaluating the capacity of a serum to neutralize a virus according to the disclosure.

The electronic device 1 comprises the organic electrochemical transistor 4, a well 5, an electronic driving circuit 2 and a processing unit 3.

A cell layer is adhered to the conductive channel and/or to the gate electrode.

The electronic device 1 is thus a sensor that has a sensitivity which is sufficiently good to detect in real time the state of growth of the cell layer adhered to the channel and/or to the gate electrode of the organic electrochemical transistor 4, so as to detect the decrease in growth of the cell layer caused by the presence of a virus which is not sufficiently neutralized by a serum to be tested.

The organic electrochemical transistor 4 comprises a source electrode 4s, a drain electrode 4d and a gate electrode 4g.

The source 4s and drain 4d electrodes are electrically connected by means of a conductive channel comprising a conducting or semiconducting polymer.

The current I_d flowing through the conductive channel is thus modulated by means of the potential difference applied between the gate and source electrodes, through an electrolytic solution.

The electronic driving circuit 2 is electrically connected with the organic electrochemical transistor 4 and it has the function of generating suitable voltage values to control the operation of the organic electrochemical transistor 4.

In particular, the electronic driving circuit 2 comprises a first output terminal connected with the gate electrode 4g of the organic electrochemical transistor 4, comprises a second output terminal connected with the source electrode 4s of the organic electrochemical transistor 4 and comprises a third output terminal connected with the drain electrode 4d of the organic electrochemical transistor 4.

The processing unit 3 (for example, a microprocessor or a microcontroller) is electrically connected with the organic electrochemical transistor 4 and it has the function of suitably processing the measured values of the current I_d flowing through the conductive channel, in order to calculate an estimation of the value of the response time of the organic electrochemical transistor 4 as the time varies, as will be explained in greater detail below.

In particular, the processing unit 3 comprises an input terminal adapted to receive a current I_d flowing through the conductive channel of the organic electrochemical transistor 4 and comprises an output terminal adapted to generate a signal S_n indicative of the state of health of at least one cell, i.e. the signal S_n indicates whether the serum has a neutralising capacity against the virus considered.

Even more in particular, the electronic driving circuit 2 is configured to apply a potential difference V_ds between the drain electrode 4d and the source electrode 4s.

Furthermore, the electronic driving circuit 2 is configured to apply a plurality of pulses of a potential difference V_gs between the gate electrode and the source electrode.

The processing unit 3 is configured to receive a respective plurality of values of pulses of the current I_d that flows through the conductive channel of the organic electrochemical transistor 4.

Furthermore, the processing unit 3 is configured to calculate, as a function of the plurality of values of the measured current, a value of an estimation of the response time of the organic electrochemical transistor 4, as will be explained in greater detail below.

Finally, the processing unit 3 is configured to compare the value of the estimated response time with respect to a threshold value TH and to generate, as a function of said comparison, the state of health signal S_n indicative of whether the serum has a neutralising capacity against the at least one virus.

In particular, if the processing unit detects that the estimated value of the response time is greater than or equal to the threshold value TH, the cell layer is healthy and therefore the virus was neutralized by the serum considered; conversely, if the processing unit detects that the estimated value of the response time is less than the threshold value TH, the cell layer breaks and therefore the virus acts, i.e. the serum considered does not have a neutralising capacity.

It may be observed that, for the sake of simplicity, FIG. 1 shows a single organic electrochemical transistor 4 positioned at a respective well 5, but more in general it is possible to have a plurality (for example six) organic electrochemical transistors analogous to 4 and positioned at a corresponding plurality of wells analogous to 5: in this case the driving circuit 2 controls the source, drain and gate electrodes of the plurality of analogous organic electrochemical transistors and thus the processing unit 3 receives and processes the measured values of the channel current generated by the plurality of organic electrochemical transistors, thereby generating a plurality of values of the estimation of the response time of the plurality of organic electrochemical transistors.

Advantageously, the processing unit 3 is configured to calculate the value of the estimation of an overall response time, as a function of the plurality of values of the estimation of the response time: for example, the average value of the plurality of values of the estimation of the response time is calculated.

According to an embodiment, the value of the estimation of the response time is calculated by interpolating the plurality of values of the measured current with a bi-exponential decay curve and measuring therefrom the value of a time response parameter T1 of the bi-exponential curve.

In particular, the current I_d through the channel is calculated with the following bi-exponential decay curve:

$$I_d = a * \exp(t/T1) + b * \exp(t/T2) + e$$

wherein:
  t is the time;
  exp is the exponential function;
  a, b, e are configuration parameters;
  T1 is a time parameter that represents the polymer charging time influenced by the ion blocking properties of the cell layer;
  T2 is a time parameter that depends on the cell layer charging time.

The current pulses are normalised between a value 1 which corresponds to the maximum channel current value under conditions of direct polarisation of the organic electrochemical transistor and a value 0 which corresponds to an average value of a defined number of points of the channel current when the latter has reached the stationary regime.

Even more in particular, the response time of the organic electrochemical transistor is equal to the value of the time parameter T1, which in turn is normalised with respect to the value of T1 that it has prior to the cell culture (indicated as T_nc), i.e. according to the following formula:

$$\text{response time } [a.u.] = T1/T\_nc.$$

For example, the electronic driving circuit 2 controls the gate 4g and source 4s electrodes for 12 seconds with a square wave composed of 5 pulses of a potential difference (between the gate 4g and source 4s electrodes) with a high value equal to 0.3 Volts and a frequency equal to 0.5 Herz, wherein the duration of the high value of each pulse is equal to 0.5 seconds and the duration of the low value is equal to 1.5 seconds (i.e. a duty cycle of 25%), maintaining the voltage value of the channel (i.e. the potential difference between the drain 4d and of source 4s electrodes) equal to 0.1 Volts.

Subsequently, the measured values of the channel current I_d are isolated and interpolated with a bi-exponential decay curve, then an average is calculated and the latter is normalised.

For greater details on the calculation, reference may be made to the document by Francesco Decataldo et al., "Organic Electrochemical Transistors: Smart Devices for

9

Real-Time Monitoring of Cellular Vitality", Advanced Material Technologies, 4, 190207 (2019).

Figure 2A:
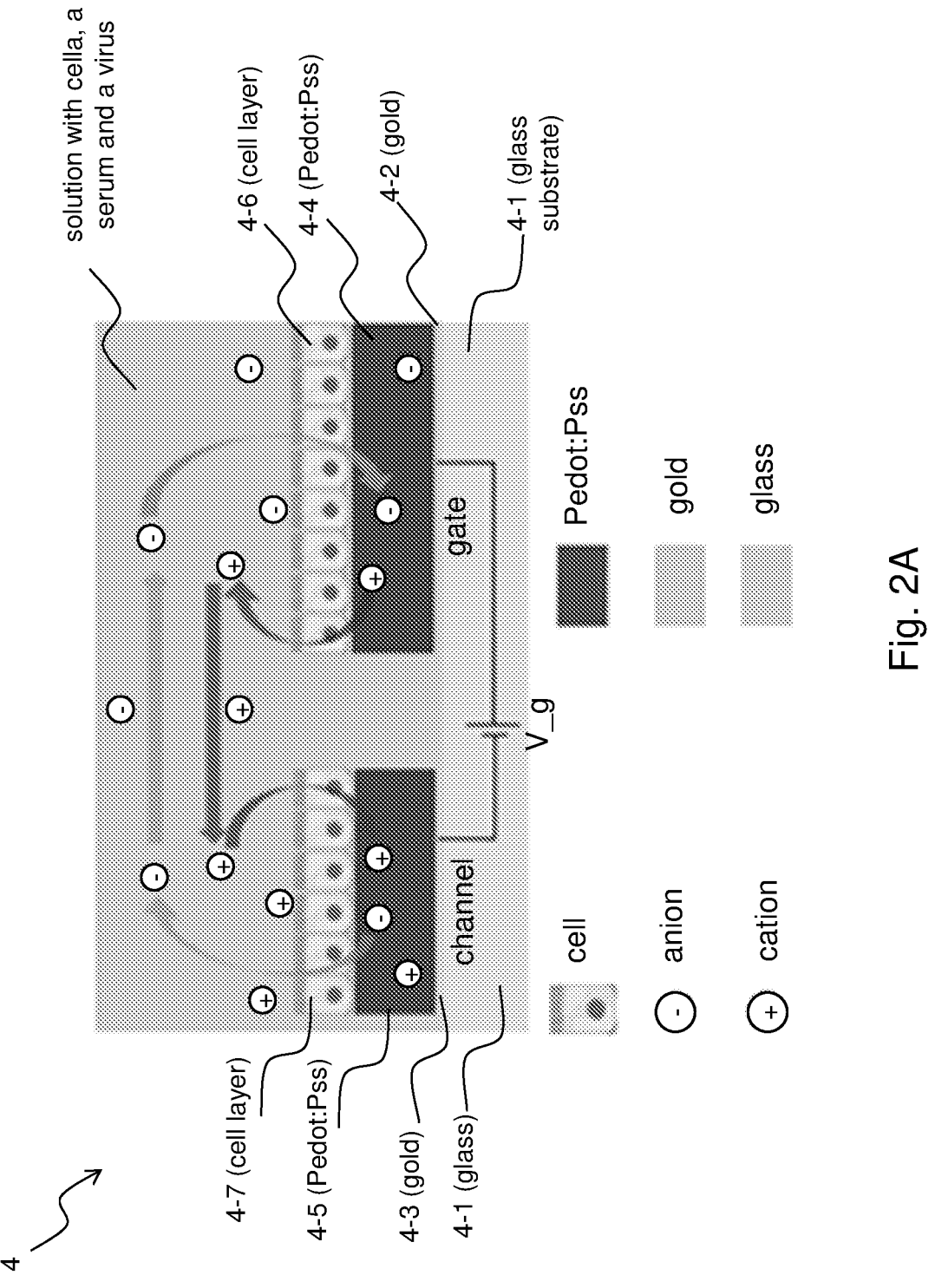
FIG. 2A shows more in detail an organic electrochemical transistor used within the electronic device in FIG. 1.
Figure 3:
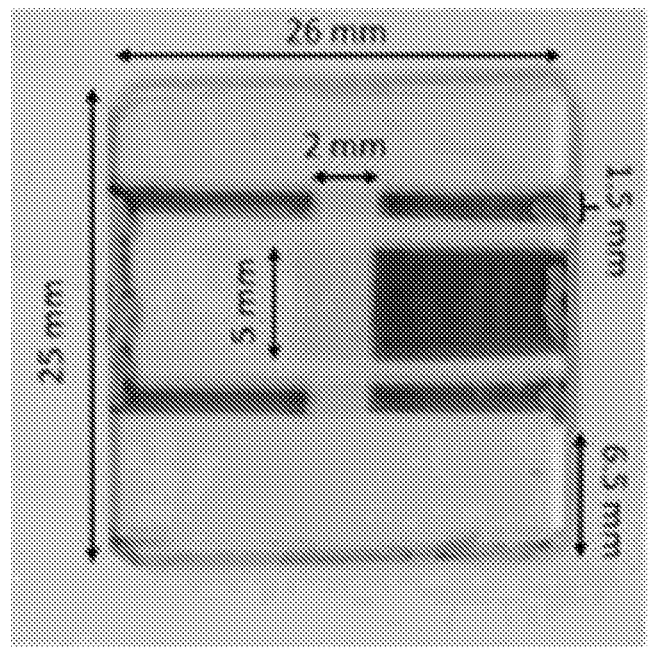
FIG. 3 shows a schematic perspective view of the organic electrochemical transistor on the left and a possible physical construction of the organic electrochemical transistor on the right.
Figure 3:
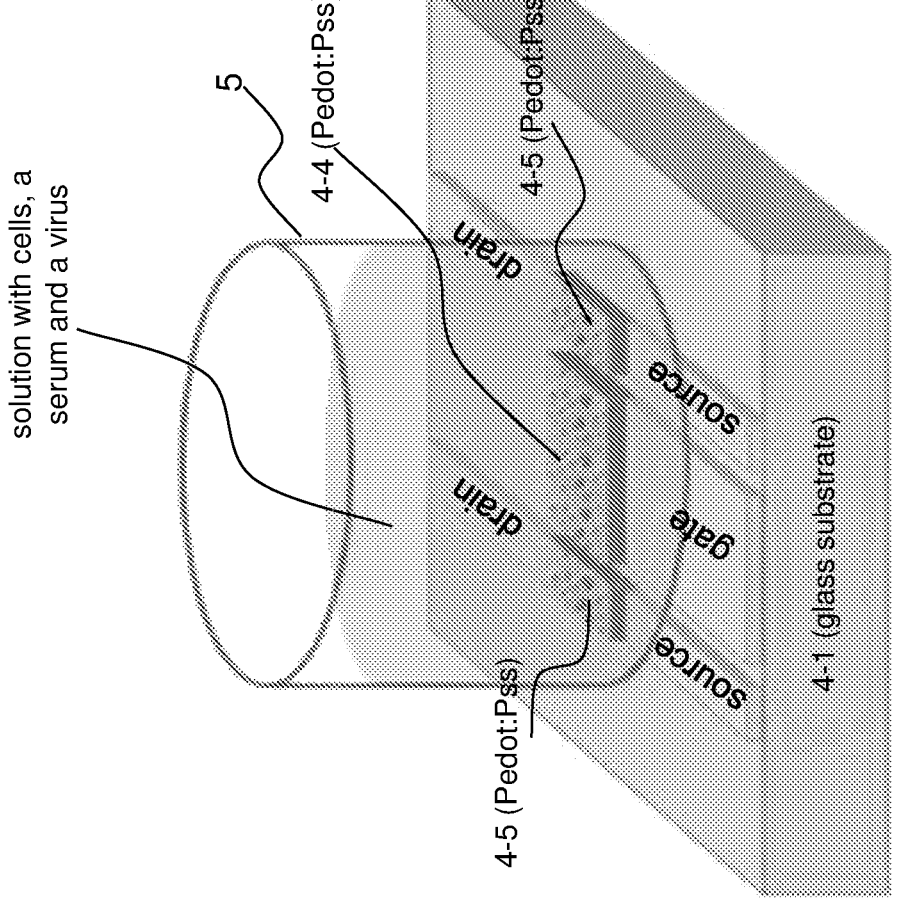

With reference to FIG. 2A and FIG. 3, they show in greater detail the organic electrochemical transistor 4 used within the electronic device 1.

The organic electrochemical transistor 4 is implemented with a planar structure that comprises a glass substrate 4-1, placed on top of which there are two gold metal contacts having a substantially rectangular shape and parallel to each other, wherein each of the two metal contacts forms the source and drain electrodes.

The gate electrode is a gold metal contact likewise placed on top of the glass substrate 4-1 and interposed between the two gold metal contacts of the source and drain electrodes.

A conducting or semiconducting polymer layer 4-4 overlaps a terminal portion of the gold contact of the gate electrode.

Furthermore, an analogous conducting or semiconducting polymer layer 4-5 overlaps, in a central portion, each of the gold contacts of the source and drain electrodes, thus forming the conductive channel of the organic electrochemical transistor 4.

It is possible to observe that the cell layer 4-7 and 4-6 to be tested grows directly respectively on the polymer layer 4-5 of the channel and the polymer layer 4-4 at the gate terminal.

The polymer used is for example Pedot:Pss (poly(3,4-ethylenedioxythiophene) polystyrene sulfonate), which is transparent or semi-transparent and thus enables the acquisition of optical images of the cell layer 4-6 and 4-7.

Under conditions of a suitable polarisation of the gate, source and drain electrodes, it occurs a flow of positive ions (cations) and negative ions (anions) that enter and exit from the polymeric material 4-5 at the source 4s and drain 4d electrodes, passing through the cell layer 4-7; furthermore it occurs a flow of positive ions (cations) and negative ions (anions) that enter and exit from the polymeric material 4-4 at the gate electrode 4g, passing through the cell layer 4-6.

The organic electrochemical transistor 4 thus monitors the flow of ions passing through the cell layer 4-6, 4-7 cultured directly on the organic electrochemical transistor 4 and a time parameter (response time) indicative of the state of health of the cell layer 4-6, 4-7 is extracted (by means of a processing unit).

In fact the health and integrity of the cell layer 4-6, 4-7 (cultured in direct contact with the organic electrochemical transistor 4) modifies the velocity with which the flow of ions enters the active polymeric material (Pedot:Pss): the response time of the organic electrochemical transistor 4 is a time parameter that is estimated by means of a suitable algorithm created with a software program run on the processing unit 3.

Alternatively, it is possible to use a vertical structure to make the organic electrochemical transistor 4, wherein, that is, the gate electrode is immersed in the solution at a defined distance (for example 2 mm) from the conductive channel: in this case the cell layer grows on a permeable porous support (transwell) interposed between the conductive channel and the vertical gate electrode, such as, for example, the 24 mm Costar Transwell support by Corning or the 0.4 μm Costar Transwell support by Corning. The cells thus grow on the permeable porous support and limit the flow of ions that pass through the cell layer and consequently influence the value of the response time of the organic electrochemical transistor 4.

The disclosure enables serum neutralisation tests to be performed using the organic electrochemical transistor 4 as a substrate for the cell culture: the organic electrochemical transistor 4 is inserted into the electronic device 1 having various culture wells for the analysis of the various serum dilutions; then the cells are suspended together with the virus (for example SARS-CoV-2) and at the various dilutions of the neutralising serum, in order then to be seeded directly onto the organic electrochemical transistor 4 and allowed to grow.

The electronic device 2 monitors the progress of the cell tissue in real time, discriminating healthy cells (in which the virus was neutralized) from ones that are infected (i.e. with the active virus, which reduces their proliferation).

The known serum neutralisation techniques enable the neutralising effect to be evaluated only at the end of the experiment (60 hours or even 72 hours): an advantage of using the electronic device 2 is that of having data in real time, thus increasing the information acquired during the experiment and possibly reducing the response time: in fact, it is possible to quantify a given serum once a threshold defined in relation to the cells and to the virus studied has been reached.

Furthermore, the use of the organic electrochemical transistor 4 has the advantage of amplifying the output signal generated, thus improving the sensitivity of the electronic device 1 that functions as a sensor.

In particular, the serum neutralisation experiment performed using the organic electrochemical transistor 4 allows the last neutralising dilution of the serum to be known after 44 hours (versus the 72 hour wait for the known tests).

Furthermore, the known procedure provides for a staining that uses toxic reagents (formaldehyde) and the final titration measurement takes place by subjective optical analysis or else requires spectrometry instruments.

The use of the organic electrochemical transistor 4, by contrast, makes it possible to avoid the use of toxic agents and maintain an objective reading without using a spectrophotometer (costly and cumbersome, thus not always present in laboratories with a biological containment level such as BSL2/BSL3/BSL4).

In fact, the instruments associated with the organic electrochemical transistor 4 can be made small and portable, optionally with disposable devices, compatible with laboratories of this type.

Finally, as the neutralisation test is a test that can be done on all animal species (the use of species-specific antibody/antibody pairs not being necessary), the use of the organic electrochemical transistor 4 can be extended to zoonotic diseases and epidemiologic studies, together with an assessment of vaccine effectiveness and duration of immune coverage.

Figure 4:
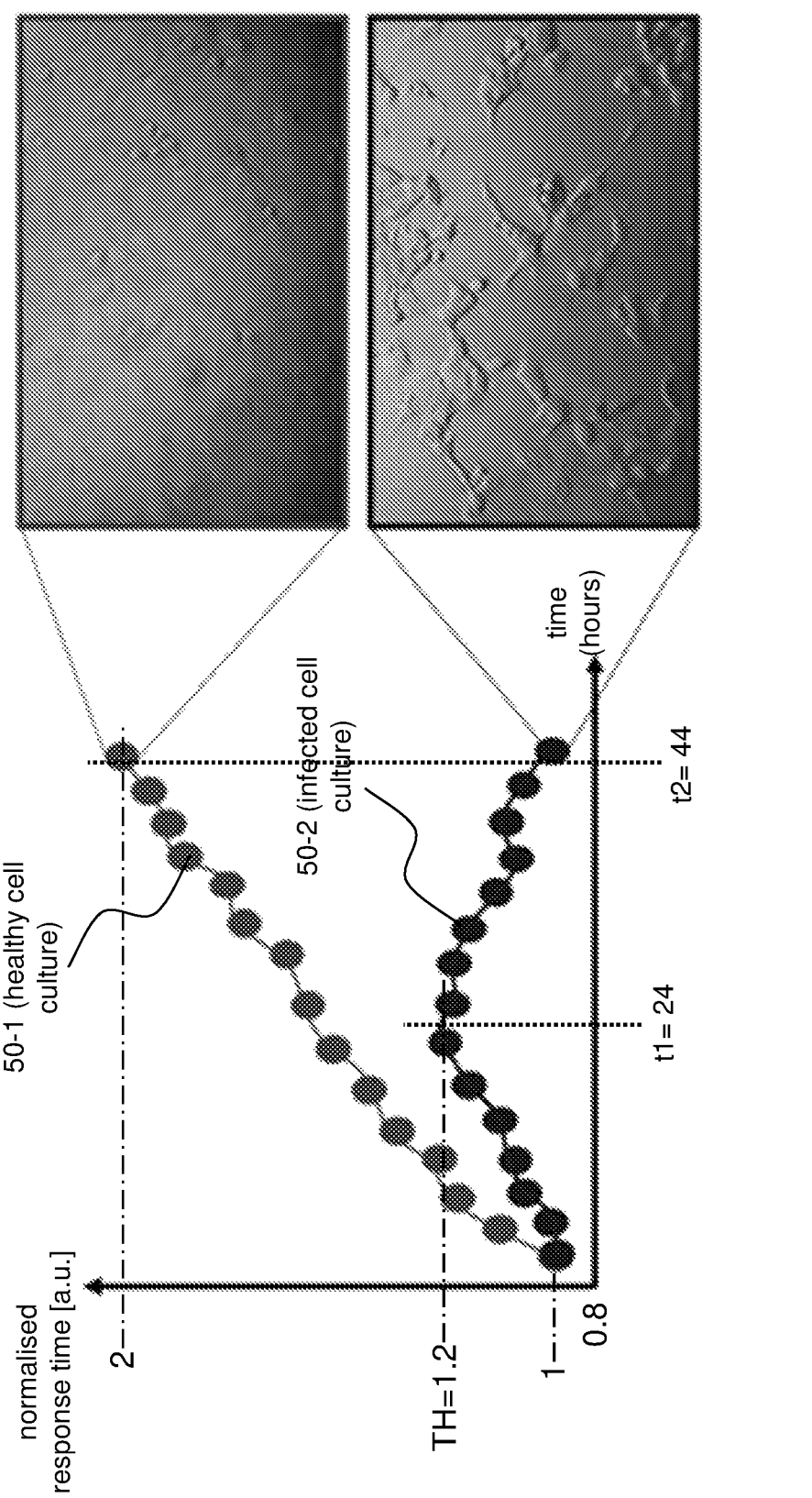
FIG. 4 schematically shows the pattern over time of the curves that represent a time parameter which estimates the response time of the organic electrochemical transistor, in the case of an uninfected culture and of a culture infected by a virus with a non-neutralising serum.

FIG. 4 schematically shows the pattern, over time, of two curves that represent two real-time estimations of the response time of the organic electrochemical transistor 4, wherein one curve 50-1 relates to a culture in the presence of a neutralising serum, i.e. not infected by a virus, and the other curve 50-2 relates to a culture infected by a virus in the presence of a non-neutralising serum, with respective optical images which show the morphologies of the cell cultures on the organic electrochemical transistor 4.

The values of the curves 50-1, 50-2 are normalised with respect to the initial value at time zero when the cell seeding began, wherein the cells are not adhered to the organic electrochemical transistor or do not form a cell layer; therefore, the values of the response time are without a unit of measurement, i.e. they are expressed in arbitrary units, abbreviated a.u.

It is possible to observe that the response time curve for the cell culture in the presence of a neutralising serum, i.e. not infected by a virus, has a substantially rising pattern due to the regular growth of the cell layer on the organic electrochemical transistor 4 and thus the estimated value of the response time of the organic electrochemical transistor 4 has a stable value above the threshold value TH defined on the basis of the cell layer considered and the virus under examination, wherein the maximum value reached for the estimated response time depends on the cell culture considered.

For example, in the case of the virus SARS-CoV-2 cultured in Vero E6 cells, the threshold value TH is equal to 1.2 a.u. and the estimated value of the response time reaches a value of about 2 a.u. after about 44 hours, whereas in other types of healthy cells the estimated value of the response time can reach values of 16-20 a.u.

The response time curve 50-2 for the cell culture infected by a virus in the presence of a non-neutralising serum first shows a pattern that substantially rises more slowly and then after a time of about t1=24 hours it shows a transition towards a substantially falling pattern, with values below the threshold value TH, due to the decrease in the growth of the cell layer caused by the presence of the virus not sufficiently neutralized by the serum: therefore, the estimated value of the response time of the organic electrochemical transistor 4 has a value that increases over time and decreases below the threshold value TH.

In other words:

low values of the response time are indicative of a diseased cell layer, in which, that is, the viral activity has impaired the growth of the cell layer, which therefore has not progressed sufficiently;

high values of the response time are indicative of a healthy cell layer, in which, that is, the viral activity was neutralized by the serum and therefore the growth of the cell layer continued regularly.

In particular, the estimated value of the response time at the instant t1=24 hours falls below a threshold value TH=1.2, which is an expected value for a healthy growth of the cell layer considered.

The threshold value is set on the basis of the cells and the virus considered, making the technology flexible with a wide range of action.

The electronic device 1 thus has the function of identifying the capacity of the serum to neutralize the virus and, indirectly, of evaluating the state of health of the cell layer in the plurality of wells.

Figure 2B:
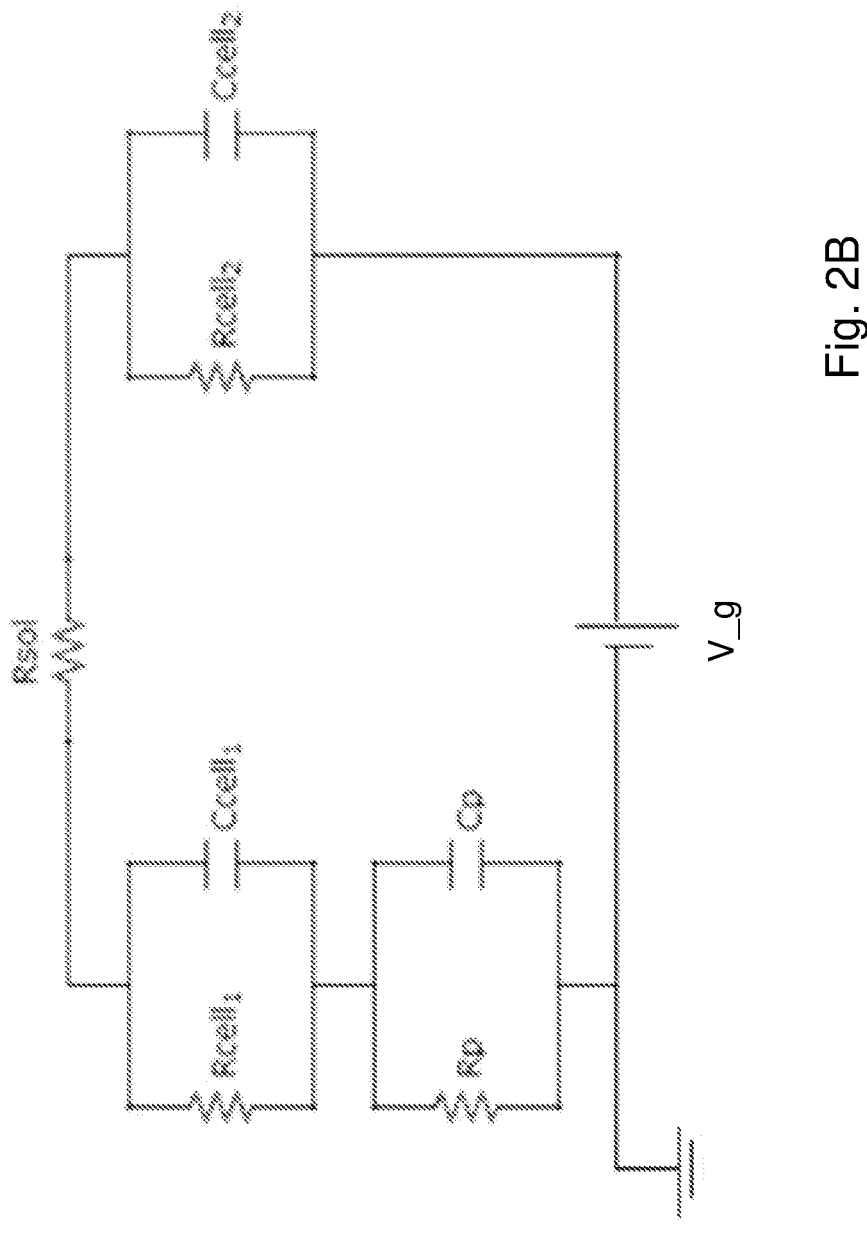
FIG. 2B shows an equivalent circuit of the organic electrochemical transistor in FIG. 2A.

With reference to FIG. 2B, it shows the equivalent circuit of the organic electrochemical transistor 4.

The equivalent circuit is obtained with the theoretical model reported by the Salleo group and based on the studies of the Roisin group.

Rsol represents the resistance of the solution that comprises the cells, the serum and the virus.

Rp and Cp represent the resistance and the capacitance of the channel of the organic electrochemical transistor 4.

Rcell1 and Ccell1 represent the resistance and the capacitance of the cell layer 4-7 at the channel between the source and drain electrodes.

Rcell2 and Ccell2 represent the resistance and the capacitance of the cell layer 4-6 at the gate electrode.

With reference to FIG. 3, on the right it shows a possible physical construction of the organic electrochemical transistor 4.

It is possible to observe that the organic electrochemical transistor 4 has a substantially rectangular shape with equal sides of 25 mm and 26 mm.

The width of the gold contacts of the source and drain electrodes is equal to about 1.5 mm.

The width of the gold contact of the gate electrode is equal to about 5 mm and the conductive polymer layer overlapping the gold contact of the gate electrode has a substantially rectangular shape with equal sides of about 5 mm and about 2 mm.

The conductive polymer layer (i.e. the channel) centrally overlapping each of the gold contacts of the source and drain electrodes has a substantially rectangular shape with equal sides of about 2 mm and about 1.5 mm.

Preferably, the ratio between the area of the gate terminal and the area of the channel is comprised between 3 and 20.

For example, it is possible to obtain an area of the gate electrode of $800\times800$ $\mu m^2$ and a channel of $300\times400$ $\mu m^2$.

The invention claimed is:

1. An in vitro method for evaluating a capacity of a serum to neutralize at least one virus, comprising steps of:
 a) preparing a solution comprising at least one cell, at least one serum and the at least one virus;
 b) placing the solution in contact with an organic electrochemical transistor comprising a source electrode, a drain electrode and a gate electrode, wherein the source and drain electrodes are electrically connected by means of a conductive channel comprising a conducting or semiconducting polymer, wherein the at least one cell is adhered to said channel and/or to the gate electrode or the at least one cell is adhered to a permeable porous support interposed between the conductive channel and the gate electrode;
 c) applying a potential difference between the drain electrode and the source electrode, applying a plurality of pulses of a potential difference between the gate electrode and the source electrode and measuring a respective plurality of values of pulses of current flowing through the channel;
 d) calculating a value of an estimation of a response time of the organic electrochemical transistor, as a function of the plurality of values of the measured current; and
 e) comparing the value of the estimated response time with respect to a threshold value and detecting, as a function of said comparison, whether the serum has a neutralizing capacity against the at least one virus.

2. The method according to claim 1, wherein the value of the estimated response time is calculated by interpolating the plurality of values of the measured current with a bi-exponential decay curve and measuring therefrom the value of a time response parameter of the bi-exponential curve.

3. The method according to claim 2, wherein a current I_d through the channel is calculated with a formula:

$$I\_d = a * \exp(t/T1) + b * \exp(t/T2) + e,$$

wherein:
 t is the time;
 exp is an exponential function;
 a, b, e are configuration parameters;
 T1 is a time parameter that represents a polymer charging time influenced by an ion blocking properties of a cell layer;
 T2 is a time parameter that depends on the cell layer charging time; and wherein the current pulses are normalized between a value 1 which corresponds to a maximum channel current value under conditions of direct polarization of the organic electrochemical transistor and a value 0 which corresponds to an average value of a defined number of points of the channel current when the channel current has reached a stationary regime, and wherein the response time of the organic electrochemical transistor is equal to the value of the time parameter T1 over time normalized with respect to the value of T1 that it has prior to preparation of the solution.

4. The method according to claim 1, wherein said plurality of pulses of the potential difference between the gate and source electrodes is a square wave having a defined difference between a high value and a low value, wherein the high value of the square wave is comprised between 0.1 Volts and 0.8 Volts and the low value of the square wave is comprised between −0.3 Volts and 0.5 Volts, in particular the potential difference between the high and low values of the square wave is equal to 0.3 Volts, wherein a duration of the high value of each pulse is comprised between 0.005 seconds and 10 seconds, in particular equal to 0.5 seconds, wherein the duration of the low value is comprised between 0.1 seconds and 30 seconds, in particular equal to 1.5 seconds, and wherein the value of the potential difference between the drain electrode and the source electrode is comprised between −0.4 Volts and 0.2 Volts, in particular equal to 0.1 Volts.

5. The method according to claim 1, comprising, before step a), the steps of:

preparing a further solution comprising said at least one cell and said at least one serum;

placing the further solution in contact with the organic electrochemical transistor;

applying said potential difference between the drain electrode and the source electrode, applying said plurality of pulses of a potential difference between the gate electrode and the source electrode and measuring a respective further plurality of values of current flowing through the channel and through said at least one cell;

calculating said threshold value, as a function of the further plurality of values of the measured current.

6. The method according to claim 1, wherein the conducting polymer is selected from: PEDOT:PSS, PEDOT-S, PEDOT:TOS, PEDOTOH:CIO4, PEDOT-co-PEDOTOH:CIO4, P3HT, PTHS, BBL, p(g2T-TT), PTHS-TMA<+>-co-P3HT, p(gNDI-g2T), p(g0T2-g6T2), Polyaniline, Polypyrrole and P-90.

7. The method according to claim 1, wherein the at least one virus belongs to a Coronaviridae family.

8. The method according to claim 7, wherein the at least one virus is selected from SARS-CoV, MERS-CoV and SARS-CoV-2.

9. The method according to claim 8, wherein the at least one virus is SARS-Cov-2.

10. The method according to claim 1, wherein the serum is obtained from an individual who has received at least one treatment against the at least one virus.

11. The method according to claim 10, wherein the at least one treatment is a vaccine against the at least one virus, wherein the vaccine is a a vaccine against a Coronavirus, or a vaccine against a SARS-CoV-2.

12. The method according to claim 1, wherein the serum is obtained from an individual who has developed an infection caused by the at least one virus, wherein the least one virus is a coronavirus or SARS-CoV-2.

13. The method according to claim 2, wherein said plurality of pulses of the potential difference between the gate and source electrodes is a square wave having a defined difference between a high value and a low value, wherein the high value of the square wave is comprised between 0.1 Volts and 0.8 Volts and the low value of the square wave is comprised between −0.3 Volts and 0.5 Volts, the potential difference between the high and low values of the square wave is equal to 0.3 Volts, wherein a duration of the high value of each pulse is comprised between 0.005 seconds and 10 seconds, in particular equal to 0.5 seconds, wherein a duration of the low value is comprised between 0.1 seconds and 30 seconds, in particular equal to 1.5 seconds, and wherein the value of the potential difference between the drain electrode and the source electrode is comprised between −0.4 Volts and 0.2 Volts, in particular equal to 0.1 Volts.

14. The method according to claim 3, wherein said plurality of pulses of the potential difference between the gate and source electrodes is a square wave having a defined difference between a high value and a low value, wherein the high value of the square wave is comprised between 0.1 Volts and 0.8 Volts and the low value of the square wave is comprised between −0.3 Volts and 0.5 Volts, the potential difference between the high and low values of the square wave is equal to 0.3 Volts, wherein a duration of the high value of each pulse is comprised between 0.005 seconds and 10 seconds, in particular equal to 0.5 seconds, wherein the duration of the low value is comprised between 0.1 seconds and 30 seconds, in particular equal to 1.5 seconds, and wherein the value of the potential difference between the drain electrode and the source electrode is comprised between −0.4 Volts and 0.2 Volts, in particular equal to 0.1 Volts.

15. The method according to claim 2, comprising, before step a), the steps of:

preparing a further solution comprising said at least one cell and said at least one serum;

placing the further solution in contact with the organic electrochemical transistor;

applying said potential difference between the drain electrode and the source electrode, applying said plurality of pulses of a potential difference between the gate electrode and the source electrode and measuring a respective further plurality of values of current flowing through the channel and through said at least one cell;

calculating said threshold value, as a function of the further plurality of values of the measured current.

16. The method according to claim 3, comprising, before step a), the steps of:

preparing a further solution comprising said at least one cell and said at least one serum;

placing the further solution in contact with the organic electrochemical transistor;

applying said potential difference between the drain electrode and the source electrode, applying said plurality of pulses of a potential difference between the gate electrode and the source electrode and measuring a respective further plurality of values of current flowing through the channel and through said at least one cell;

calculating said threshold value, as a function of the further plurality of values of the measured current.

17. The method according to claim 4, comprising, before step a), the steps of:

preparing a further solution comprising said at least one cell and said at least one serum;

placing the further solution in contact with the organic electrochemical transistor;

applying said potential difference between the drain electrode and the source electrode, applying said plurality of pulses of a potential difference between the gate electrode and the source electrode and measuring a respective further plurality of values of current flowing through the channel and through said at least one cell;

calculating said threshold value, as a function of the further plurality of values of the measured current.

18. The method according to claim 12, comprising, before step a), the steps of:

preparing a further solution comprising said at least one cell and said at least one serum;

placing the further solution in contact with the organic electrochemical transistor;

applying said potential difference between the drain electrode and the source electrode, applying said plurality of pulses of a potential difference between the gate electrode and the source electrode and measuring a respective further plurality of values of current flowing through the channel and through said at least one cell;

calculating said threshold value, as a function of the further plurality of values of the measured current.

19. The method according to claim 2, wherein the conducting polymer is selected from: PEDOT:PSS, PEDOT-S, PEDOT:TOS, PEDOTOH:CIO4, PEDOT-co-PEDOTOH:CIO4, P3HT, PTHS, BBL, p(g2T-TT), PTHS-TMA<+>-co-P3HT, p(gNDI-g2T), p(g0T2-g6T2), Polyaniline, Polypyrrole and P-90.

\* \* \* \* \*